A. C. JUDD.
FLEXIBLE PACKING FOR ENGINE PISTON RODS AND THE LIKE.
APPLICATION FILED JAN. 26, 1911.

1,038,759.

Patented Sept. 17, 1912.

Witnesses:
Louis J. Schilling.
S. S. Dunham.

Arthur C. Judd, Inventor

By his Attorneys
Kerr, Page, Cooper & Hayward

UNITED STATES PATENT OFFICE.

ARTHUR C. JUDD, OF NEW YORK, N. Y.

FLEXIBLE PACKING FOR ENGINE PISTON-RODS AND THE LIKE.

1,038,759.

Specification of Letters Patent.

Patented Sept. 17, 1912.

Application filed January 26, 1911. Serial No. 604,718.

*To all whom it may concern:*

Be it known that I, ARTHUR C. JUDD, a citizen of the United States, residing at New York, in the county and State of New York, have invented certain new and useful Improvements in Flexible Packing for Engine Piston-Rods and the Like, of which the following is a full, clear, and exact description.

This invention relates to piston packings, more particularly for steam engine pistons, and its chief object is to provide an improved packing of the so-called "flexible" type, for use with pistons which for any reason are subject to "vibration" or movement out of alinement with the axis of the engine cylinder.

With this and other objects in view the invention consists in the novel features of construction and combinations of elements hereinafter described.

A convenient and effective embodiment of the invention is illustrated in the accompanying drawing, of which—

Figure 1:
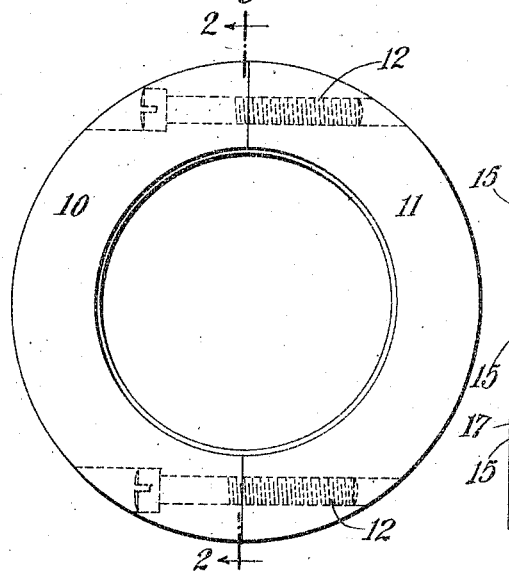
Figure 2:
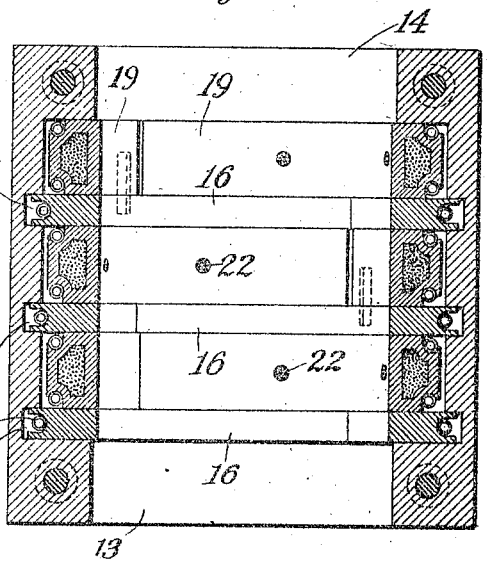
Figure 3:
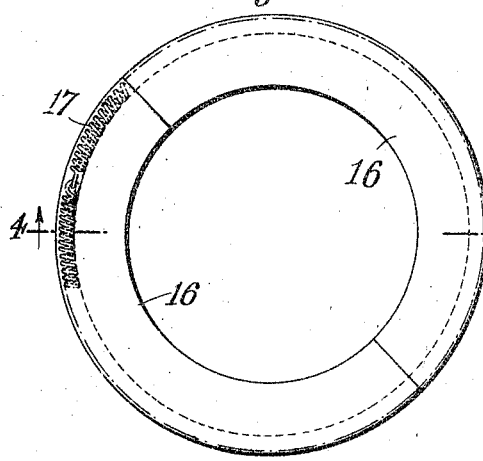
Figure 5:
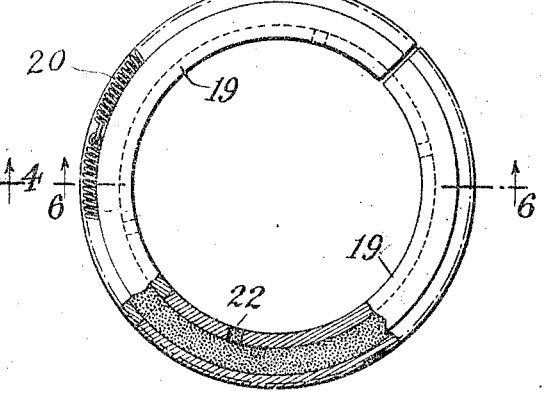
Figure 4:
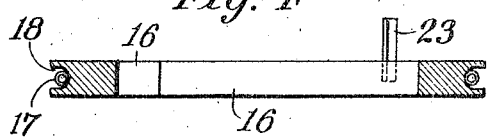
Figure 6:
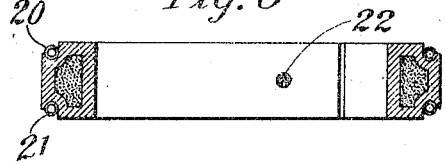

Figure 1 is an end view of the cage or receptacle which carries the packing and steam rings. Fig. 2 is a section on line 2—2 of Fig. 1. Fig. 3 is a plan view of one form of steam ring which may be employed in my invention. This figure also shows in dotted lines the encircling coil spring employed in this form to hold the parts of the sectional steam ring yieldingly together when the packing is in use. Fig. 4 is a section on line 4—4 of Fig. 3. Fig. 5 is a plan view, partly in section, of a convenient and effective form of self-lubricating packing ring which can be employed to advantage in conjunction with a suitable cage, as for example one of the type shown in Fig. 2. Fig. 6 is a section on line 6—6 of Fig. 5.

The type of cage which I prefer to employ with my improved rings is illustrated in Figs. 1 and 2. The cage there shown is cylindrical in form and is divided longitudinally into parts or sections, the number of sections in the present instance being two, designated by 10 and 11. When in use the sections are secured together by suitable means, as for example bolts 12. At the ends of the cage inwardly extending abutments or flanges 13, 14 are provided, preferably integral with the body of the cage, as shown.

The interior of the cage, between the abutments or flanges, is grooved circumferentially, as at 15, three such grooves being provided in the particular device illustrated. The interior of the cage is thus provided with zones of different diameters, the diameter of the grooves 15 being greater than at points intermediate to the grooves; while at the flanges or abutments 13, 14, the inner diameter is less than at the said intermediate points.

The grooves 15, that is, the zones of greatest diameter, are in the present instance designed to receive the steam rings, for example rings of the kind illustrated in Figs. 2 and 3, each consisting of radially movable parts or sections, two in the device shown, designated by 16. These sections are held yieldingly together by any suitable means, as for instance by an encircling coil-spring 17 seated in a groove 18 in the outer periphery of the ring. The inner diameter of each steam ring is preferably such as to make the ring fit snugly the piston rod with which it is to be used, while the outer diameter is small enough to permit radial expansion of the ring in the grooves as the piston rod vibrates. In practice this outer diameter is usually determined with reference to the amount or extent of the vibration of the rod.

Between the steam rings, and between the first (or last) steam ring and the adjacent abutment 13 or 14 as the case may be, suitable packing rings are provided. When the latter are of the sectional type the steam rings and the packing rings are preferably arranged to break joints, suitable means for insuring such arrangement being provided, as for example the means hereinafter described.

When the packing is in use (generally with the abutment 13 innermost or toward the steam pressure so that the pressure acts in the direction of the arrow in Fig. 2) the effect of the steam pressure is to force the first steam ring firmly against the opposite face of the groove in which the ring is mounted. Any steam escaping around the outside of the ring has a similar action on the next ring, and so on in succession. In a well designed and well constructed packing there will be no escape of steam past the last or outermost ring. Any vibration or lateral movement of the piston rod from accurate alinement with the axis of the cylinder will be compensated by alteration in the positions of the rings in their respective grooves, and variation in the diameter of the rod will cause expansion or contraction of the rings, without injury to the rings or impairment of their efficiency.

When it is desired to use self-lubricating packing rings in a flexible piston-packing, rings of the type illustrated in Figs. 2, 5, and 6 may be employed to advantage. In this form the tubular ring is made in radially movable parts or sections, two in the present instance, designated by 19, the sections being held yieldingly together by any suitable means, for example coil-springs 20, 21, seated in circumferential grooves at the outer edges of the ring. The interior of the tubular ring is filled with lubricating material, preferably graphite, which, as the piston rod moves, is drawn from emission apertures 22 in sufficient amount to keep the contacting parts of rod and ring well lubricated.

As stated above, it is desirable to have the sectional steam rings and packing rings break joints. To insure the rings being always assembled in this manner one, at least, of each pair of rings, is provided with an axially extending pin or stud 23 to fit between sections of the adjoining ring, as shown in Fig. 2.

As in the case of the steam ring, the inner and outer dimensions of the flexible or expansible packing rings are such as to make the rings fit the piston rod snugly and to fit loosely enough, in the zones between the grooves 15 in the interior of the cage, to permit the necessary movement of the ring sections to compensate for vibration of the rod or variation in its diameter.

The devices herein specifically illustrated and described are those employed in the preferred embodiment of the invention, but it will be understood by persons skilled in the art that other forms may be used without departure from the proper spirit and scope of the invention as defined by the appended claims.

What I claim is:

1. In a flexible piston-packing, the combination with a cage having inner circumferential grooves, of expansible steam rings mounted in the grooves and expansible tubular packing rings containing lubricating material, arranged between the steam rings and having emission apertures for the lubricating material.

2. In a flexible piston-packing, the combination with a cage having inner circumferential grooves, of steam rings mounted in the grooves, each ring comprising a plurality of radially movable sections and yielding means for urging the sections inwardly, and packing rings arranged between the steam rings and outside of said grooves.

3. In a flexible piston-packing, a cage for packing, and steam rings, comprising a hollow body having interior zones of different diameters, in combination with flexible steam and packing rings arranged alternately in said zones, the rings being of less diameter than their respective zones.

4. In a flexible piston-packing, a cage for packing and steam rings, comprising a hollow cylindrical body having a plurality of different inner diameters, and inwardly extending circumferential flanges or abutments at the ends of the body, the inner diameter of the flanges or abutments being less than the smallest inner diameter of the said body.

5. In a flexible piston-packing, the combination with a tubular cage having inner circumferential grooves, of expansible steam rings mounted in the grooves, and expansible packing rings between the steam rings and outside of the grooves, the packing rings being filled with lubricating material and provided with emission apertures therefor.

6. In a flexible piston-packing, in combination, a tubular cage; self-lubricating packing rings therein, composed of radially movable sections containing lubricating material and having emission apertures therefor; yielding means associated with the rings for urging the sections thereof inwardly; and flexible steam rings associated with the packing rings.

7. In a flexible piston-packing, in combination, a tubular packing ring composed of radially movable sections containing lubricating material and provided with emission apertures therefor, and means associated with the ring to press the sections thereof yieldingly inward, in combination with a cage inclosing the ring, a flange or abutment extending inwardly from the cage on one side of the ring, and a steam ring on the other side of the packing ring.

8. In a flexible piston-packing, a tubular packing ring composed of radially movable sections containing lubricating material and having emission apertures therefor, the ring being provided with outer circumferential grooves, and coil-springs in said grooves to press the ring sections yieldingly inward.

In testimony whereof I affix my signature in the presence of two subscribing witnesses.

ARTHUR C. JUDD.

Witnesses:
S. S. DUNHAM,
M. LAWSON DYER.